(12) United States Patent
Xu et al.

(10) Patent No.: US 8,123,538 B2
(45) Date of Patent: Feb. 28, 2012

(54) ELECTRONIC CARD CONNECTOR

(75) Inventors: Xiang Xu, Shanghai (CN); Hwa-Li Wang, Taipei Hsien (TW)

(73) Assignee: Molex Incorporated, Lisle, IL (US)

( * ) Notice: Subject to any disclaimer, the term of this patent is extended or adjusted under 35 U.S.C. 154(b) by 425 days.

(21) Appl. No.: 12/085,330

(22) PCT Filed: Nov. 20, 2006

(86) PCT No.: PCT/CN2006/003125
§ 371 (c)(1),
(2), (4) Date: May 12, 2009

(87) PCT Pub. No.: WO2007/059702
PCT Pub. Date: May 31, 2007

(65) Prior Publication Data
US 2010/0035474 A1    Feb. 11, 2010

(30) Foreign Application Priority Data
Nov. 22, 2005   (CN) .......................... 2005 2 0046792

(51) Int. Cl.
*H01R 29/00*   (2006.01)
(52) U.S. Cl. ........................................ 439/188; 439/489
(58) Field of Classification Search .................. 439/188, 439/489, 630
See application file for complete search history.

(56) References Cited

U.S. PATENT DOCUMENTS

| | | | |
|---|---|---|---|
| 6,305,960 B1 * | 10/2001 | Fan | 439/188 |
| 6,431,893 B1 | 8/2002 | Chang et al. | |
| 7,128,613 B1 * | 10/2006 | Lee et al. | 439/630 |
| 7,645,166 B1 * | 1/2010 | Wang | 439/630 |
| 2010/0112835 A1 * | 5/2010 | Matsunaga | 439/79 |

FOREIGN PATENT DOCUMENTS

| | | |
|---|---|---|
| CN | 2358595 | 1/2000 |
| CN | 2454920 | 10/2001 |

OTHER PUBLICATIONS

International Search Report for PCT/CN2006/003125.

* cited by examiner

*Primary Examiner* — Xuong Chung Trans
(74) *Attorney, Agent, or Firm* — Stephen L. Sheldon (57) ABSTRACT

The present invention provides an electronic card connector, and intends to arrange one single testing terminal which forms a testing circuit together with an inherent conductive terminal of the electronic card connector, thereby obtaining a testing function which must be done by using two insertion pins in the prior art. Due to omitting one testing terminal, the volume of the electronic card connector is further reduced, and product assembly becomes more simply and opera table, thereby improving product efficiency, and greatly lowing manufacturing cost.

13 Claims, 10 Drawing Sheets

ELECTRONIC CARD CONNECTOR

This application is a national phase of PCT Application No. PCT/CN2006/003125, filed Nov. 20, 2006, which in turn claims priority to China Patent Application No. 200520046792.2, filed Nov. 22, 2005.

FIELD OF THE INVENTION

The present invention relates to an electronic card connector, and more particularly to an electronic card connector with a testing function, which uses a testing terminal and an inherent conductive terminal thereof to form a conductive circuit.

BACKGROUND OF THE INVENTION

Electronic card connectors are widely used for electronic products insertable by cards, for transmitting direct current. A conventional electronic card connector commonly needs two testing terminals, to form a test circuit. During using, the two testing terminals are respectively arranged at a dielectric body and a shield shell of the electronic card connector, for conductively contacting or shutting-off the test circuit via an electronic card inserting or pulling out of the electronic card connector.

Figure 1:
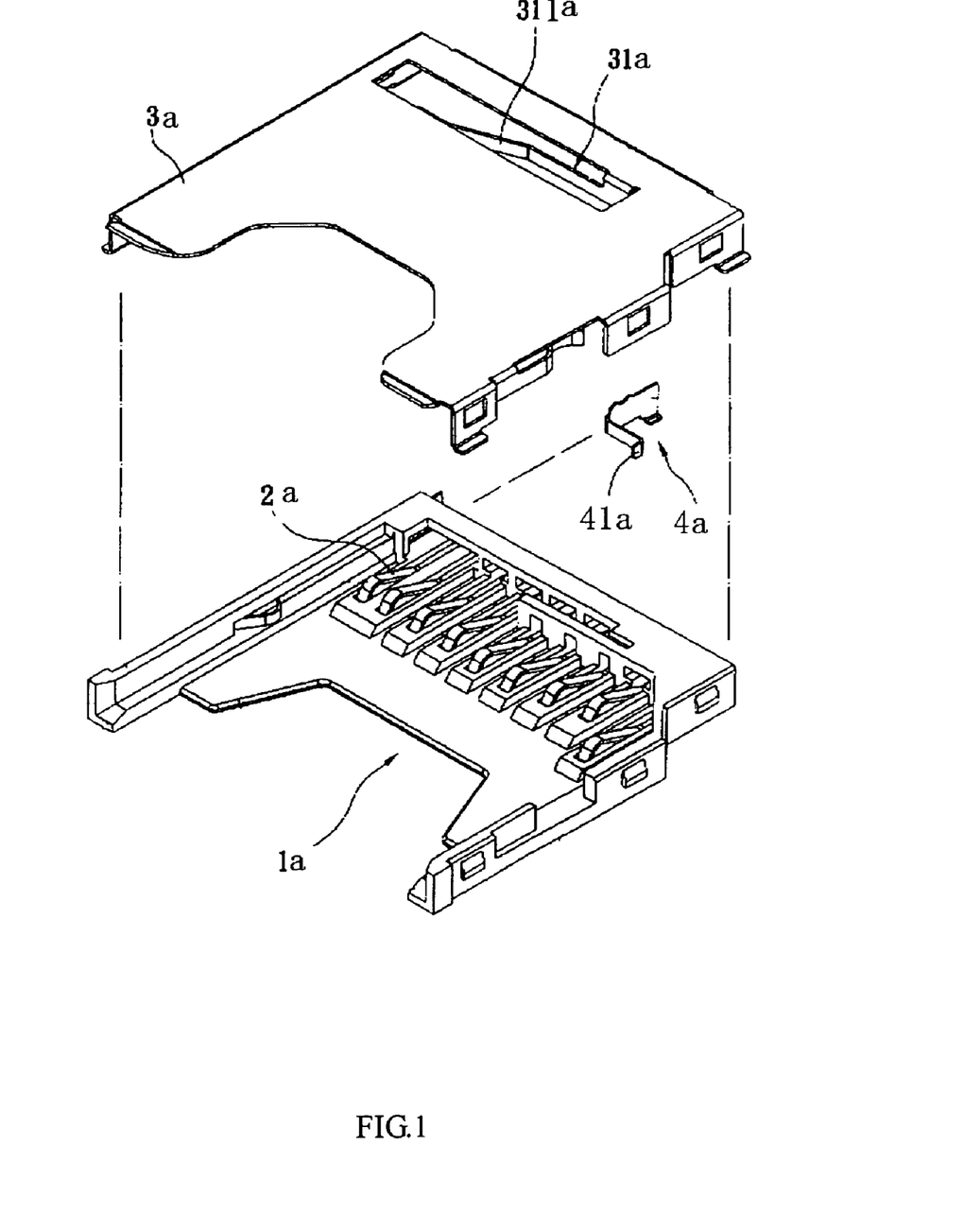
FIG. 1 is an exploded perspective view of a prior art electronic card connector.
Figure 2:
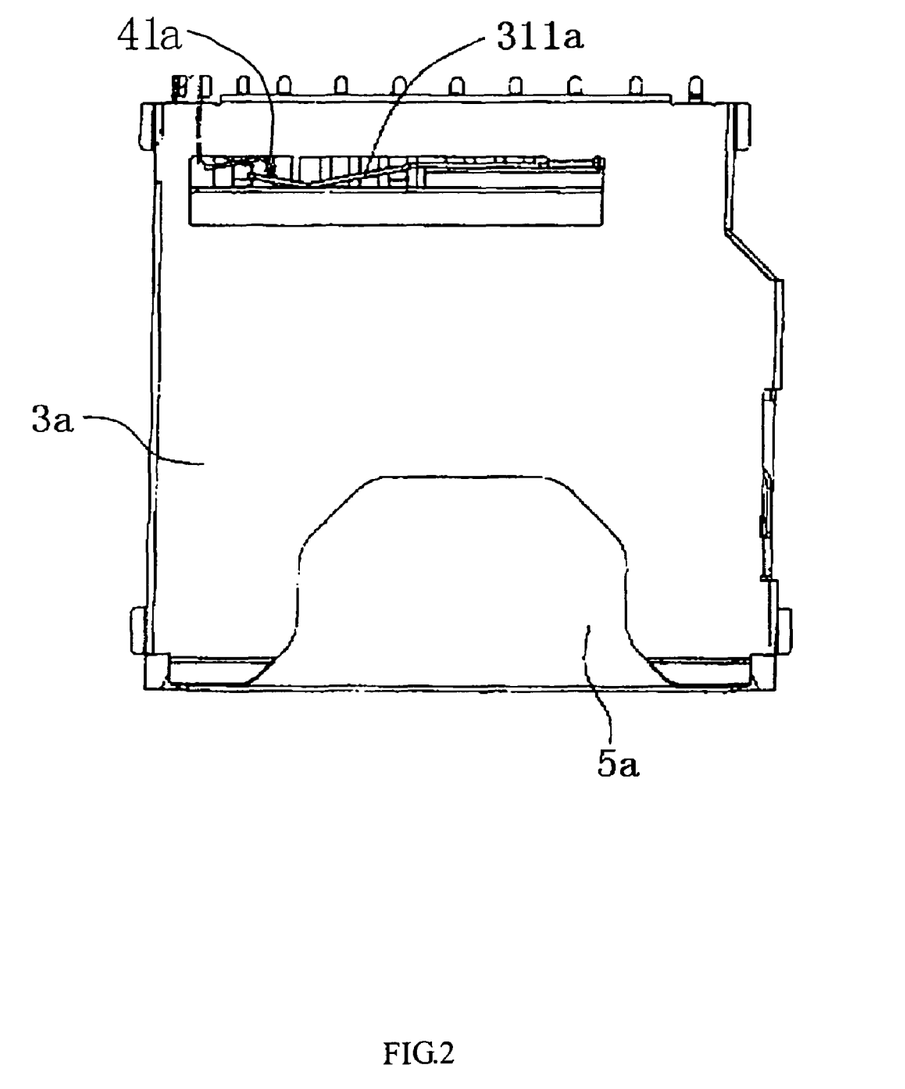
FIG. 2 is a view of a prior art electronic card connector wherein an electronic card has been inserted into the electronic card connector.

A related prior art is disclosed by a Taiwan patent publication No. 585357, filed by Chen Lizhen on 14 Jan. 2003, published on 21 Apr. 2004, and titled "improved resilient contacting piece of an electronic card connector". Referring to FIGS. 1 and 2, the connector of the patent comprises a dielectric body 1a, a plurality of contacting terminals 2a formed on the dielectric body 1a; a metal shield shell 3a, covering on the dielectric body 1a, for making an electronic card be inserted between the dielectric body 1a and the metal shield shell 3a; a contacting piece 31a, formed by punching downward from a rear side of the metal shield shell 3a, and the contacting piece 31a has a resilient contacting portion 311a; a test piece 4a, embedded in a rear side of the dielectric body 1a, and has a resilient contacting section 41a, corresponding to the resilient contacting portion 311a of the contacting piece 31a. According to the above-mentioned structure, after an electronic card 5a is inserted into the electronic card connector, the electronic card will firstly push against the resilient contacting portion 311a of the resilient piece 31a, and the resilient contacting portion 311a will then forwardly push against the resilient contacting section 41a of the test piece 4a, for making the contacting piece and the test piece both be in a pushed state, thereby having a resilient contacting return route.

Analysis from the above, the conventional electronic card connector must use two insertion pins to form a test circuit, thereby two spaces for the two insertion pins must be pre-reserved during manufacturing the electronic card connector, so it is a lengthy and costly work during assembly, and at the same time, the volume of the electronic card connector cannot be continuously reduced, resulting in a relative high manufacturing cost for the whole electronic card connector.

SUMMARY OF THE INVENTION

An object of the present invention is to provide an improved electronic card connector, which is further miniaturized, convenient in assembly and with low manufacturing cost.

To fulfill the above-mentioned object, the present invention provides an electronic card connector, which intends to provide only one testing terminal to form a test circuit with one of the inherent conductive terminals of the electronic card connector, thereby to obtain a testing function of the prior art in which two insertion pins must be used.

Therefore, due to one testing terminal omitted, the present invention makes the volume of the electronic card connector be further reduced, and assembly of the product be more simple and convenient, thereby improving production efficiency and greatly lowing manufacturing cost thereof.

DETAILED DESCRIPTION OF THE INVENTION

Figure 3:
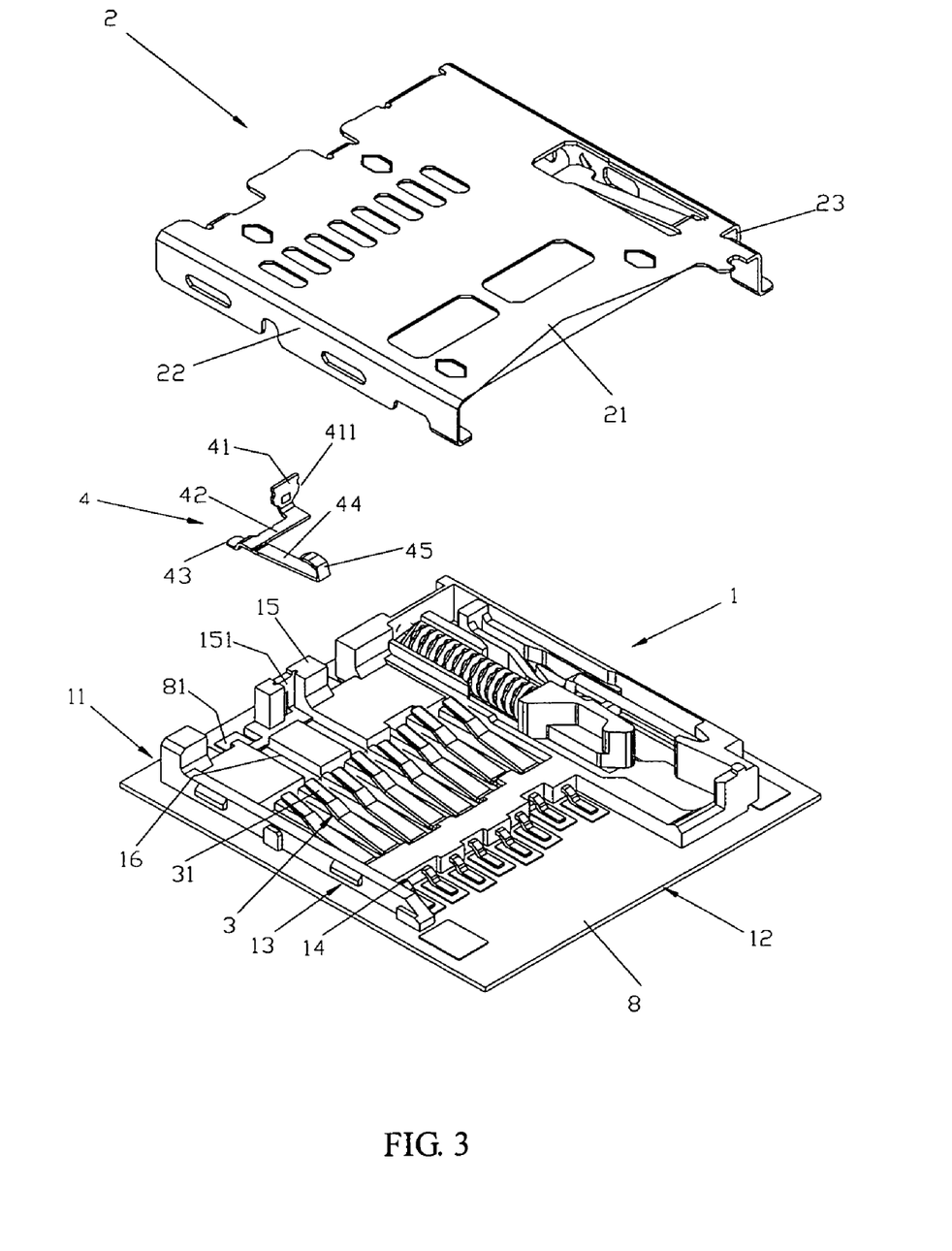
FIG. 3 is an exploded perspective view of an electronic card connector according to a first embodiment of the present invention.
Figure 7:
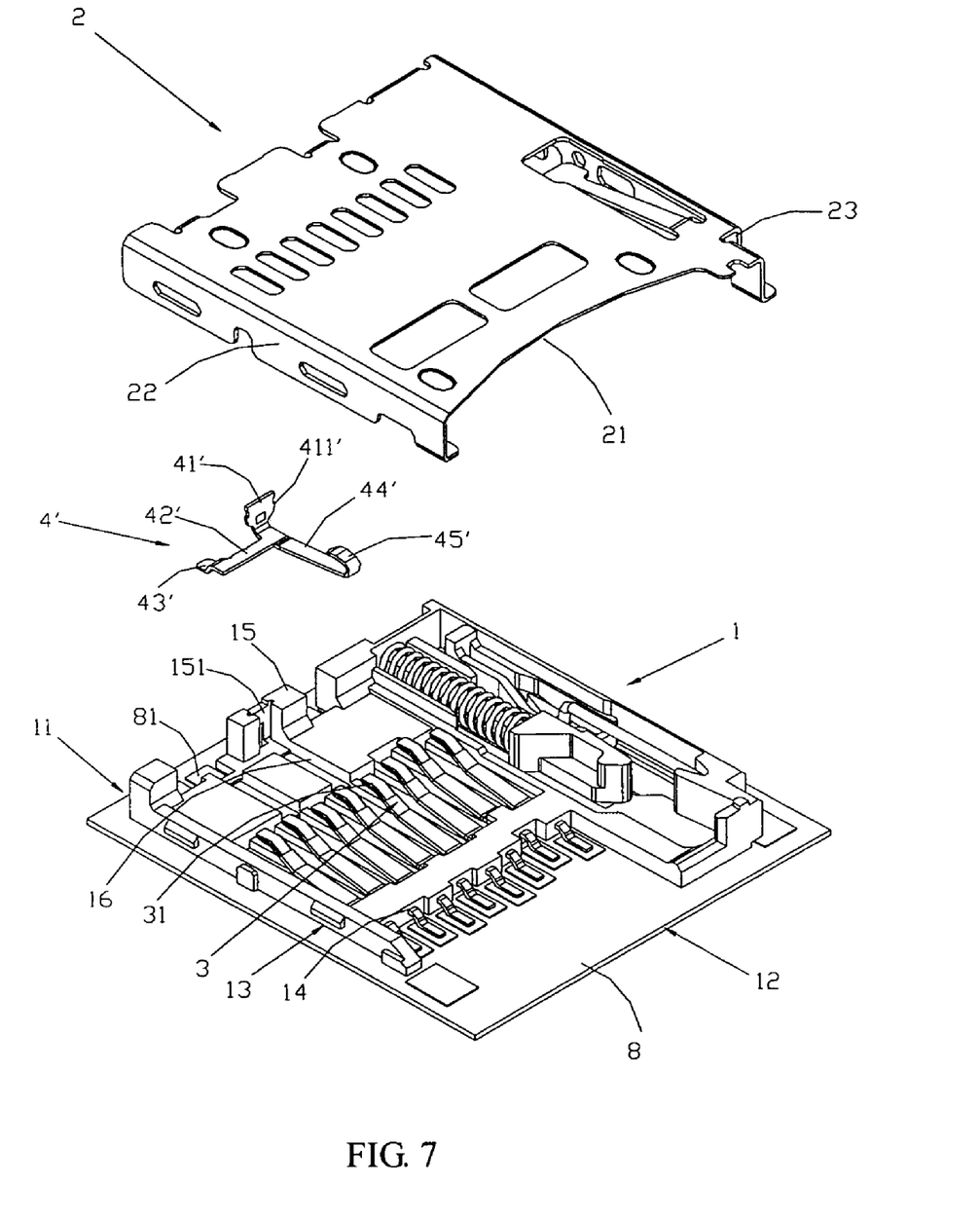
FIG. 7 is an exploded perspective view of an electronic card connector according to a second embodiment of the present invention.
Figure 8A:
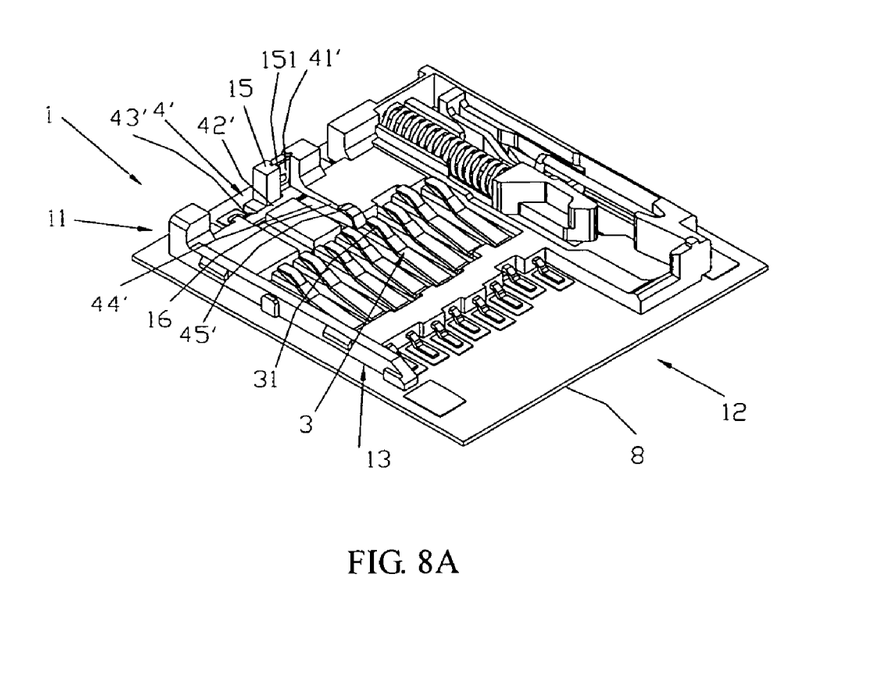
FIG. 8A is an assembled perspective view of the electronic card connector of a second embodiment of the present invention with a testing terminal having been mounted on an insulative housing of the electronic card connector, wherein a shield shell is omitted.
Figure 8B:
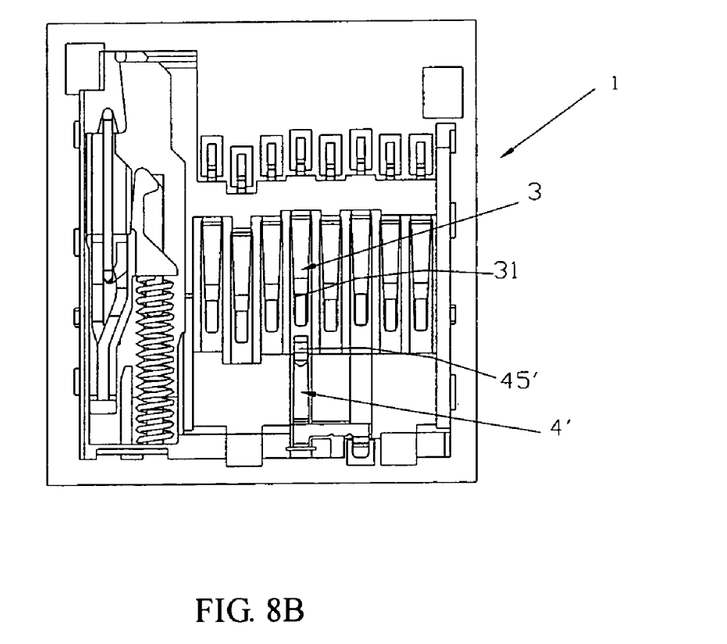
FIG. 8B is a top view of the FIG. 8A.
Figure 11:
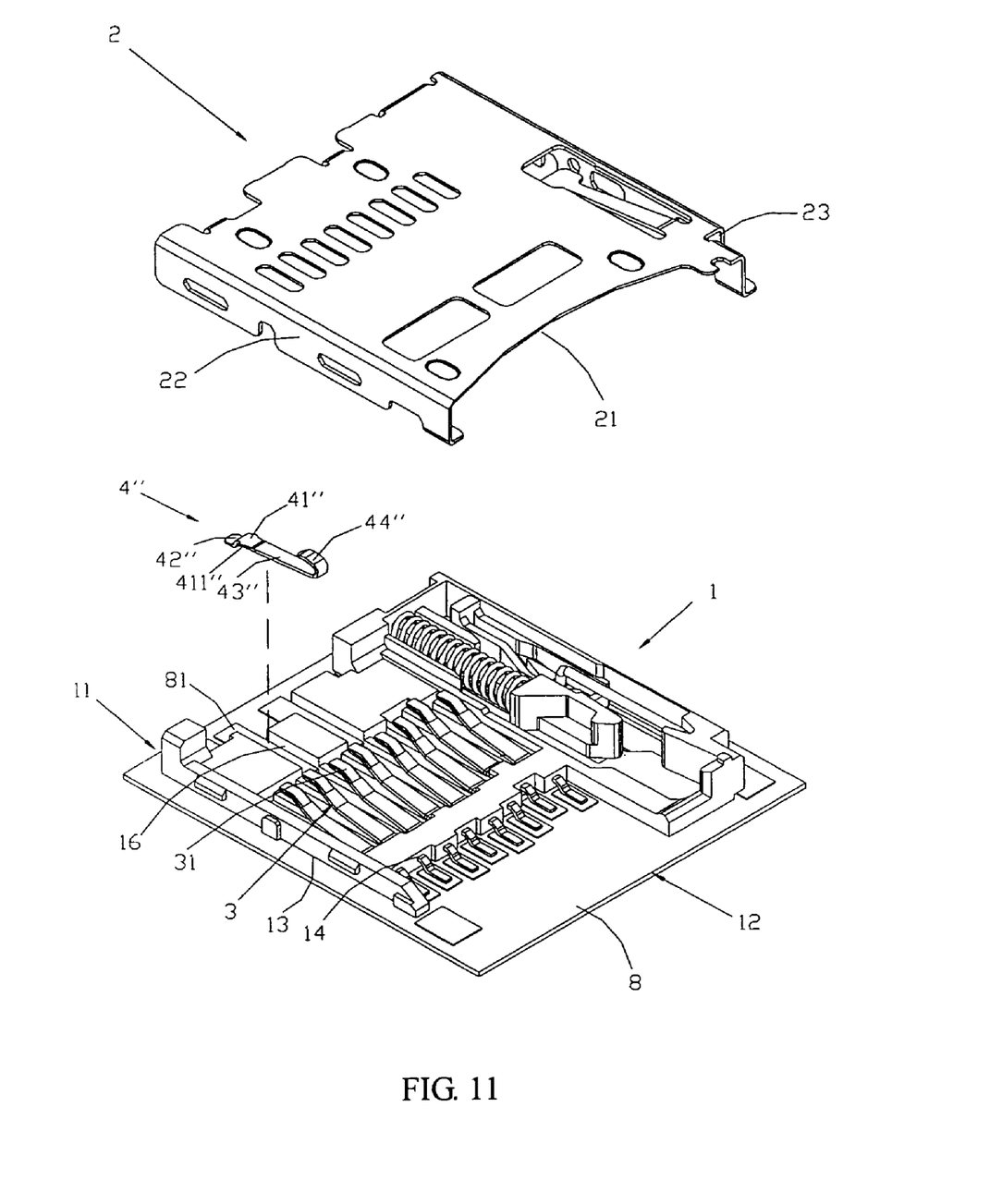
FIG. 11 is an exploded perspective view of an electronic card connector according to a third embodiment of the present invention.

Referring to drawings in detail, and first referring to FIGS. 3, 7 and 11, which disclose three preferred embodiments of an electronic card connector according to the present invention, respectively, and the electronic card connector mainly includes two components, one is an insulative housing 1, and the other is a shield shell 2. The insulative housing 1 may be formed by press molding from an insulative material, such as plastic, and the shield shell may formed by being punched from a conductive metal sheet, and also may be formed by molding from plastic. The insulative housing 1 and the shield shell 2 are cooperated to form a receiving cavity 5 with an insertion opening 6 for the electronic card (see FIGS. 5 and 9).

Figure 5:
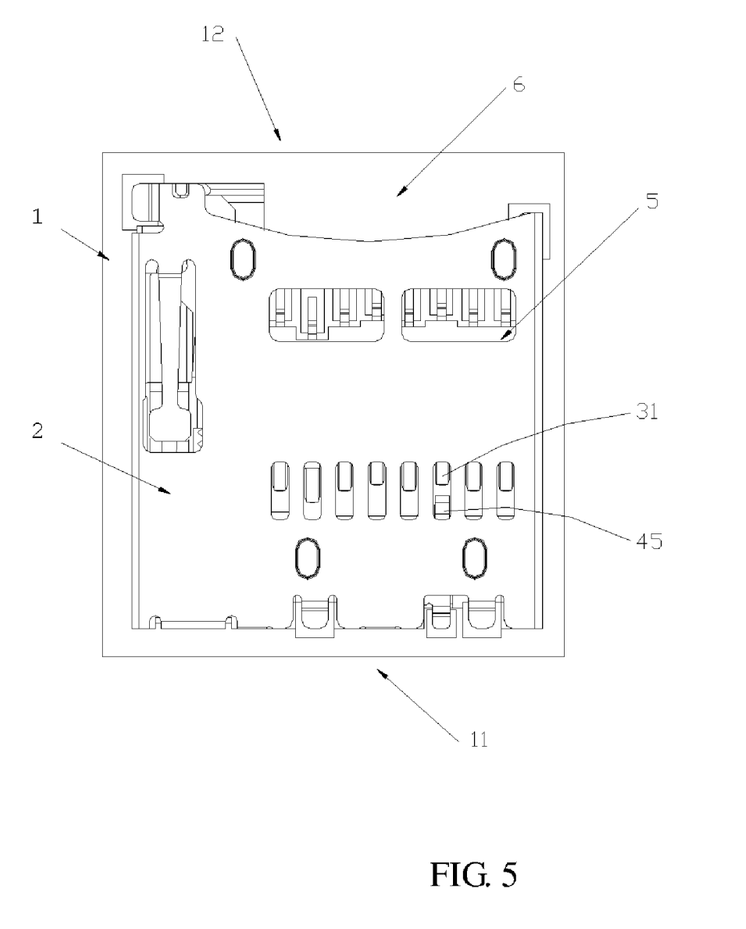
FIG. 5 is a top view of the electronic card connector of the first embodiment after being assembled, showing location of the testing terminal in the electronic card connector.
Figure 9:
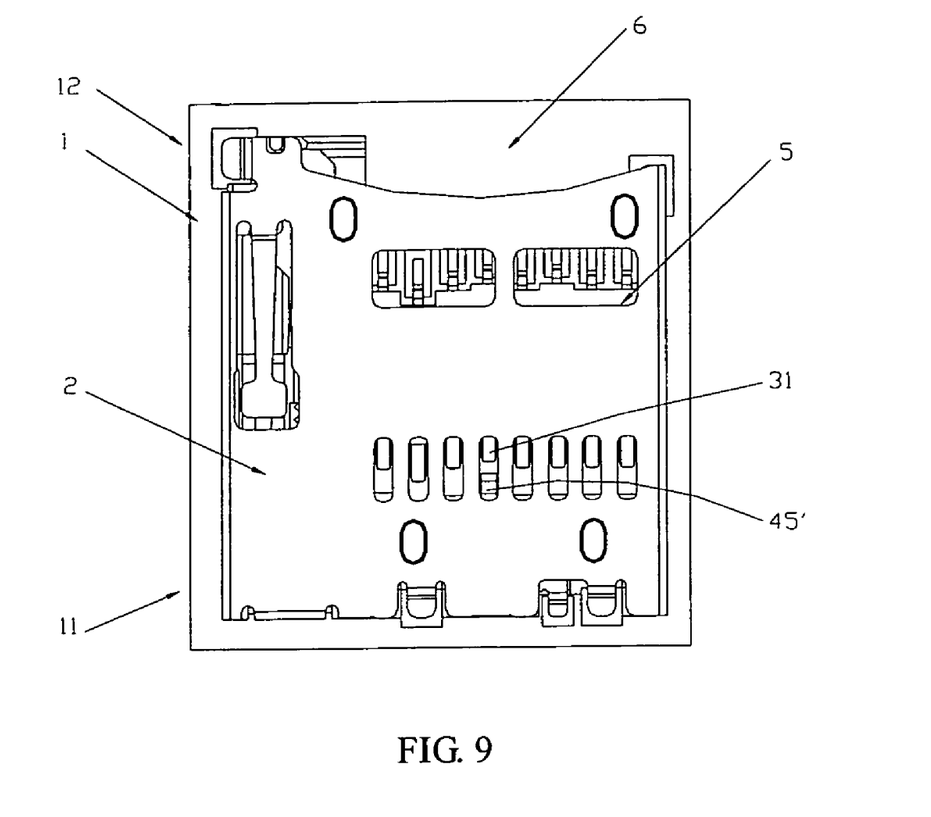
FIG. 9 is a top view of the electronic card connector of the second embodiment after being assembled, showing location of the testing terminal in the electronic card connector.

Referring to FIGS. 3, 7 and 11, the insulative housing 1 includes a front portion 11 and a rear portion 12, the insertion opening 6 for the electronic card is located at the rear portion 12, the electronic card passes through the rear portion 12 of the insulative housing 1 to get to the front portion 11 when it enters into the receiving cavity 5 (see FIGS. 5 and 9). The insulative housing 1 has a bottom wall 13 forming the receiving cavity 5 for the electronic card, and the bottom wall 13 is mounted on a circuit board 8 having soldering pads 81.

Referring to FIGS. 3, 7 and 11 again, a plurality of conductive terminals 3 are mounted into the corresponding passageways 14 of the rear portion 12 of the insulative housing 1, respectively. Each conductive terminals 3 has a contacting portion 31 cantilevering forwardly to the receiving cavity 5, for contacting a proper contacting point 71 of the electronic card 7 which have inserted into the receiving cavity 5 (see FIGS. 6 and 10).

The shield shell 2 is shaped generally in a rectangular, which includes a top wall 21 forming the top of the receiving cavity 5 for the electronic card. The shield shell 21 has a pair of side walls 22 and 23, which extend along two opposite sides of the top wall 21, and overhangs downward therefrom.

FIGS. 3 to 6 show various states of the first preferred embodiment of the present invention, and FIGS. 7 to 10 show various states of the second preferred embodiment of the present invention. FIG. 11 shows the third preferred embodiment of the present invention. The identical reference numbers in the drawings indicate the identical components in each preferred embodiment. It should be understood, that the present invention intends to provide only one testing terminal, which is mounted at the front portion 11 of the insulative housing 1, spaced with and facing to anyone of the plurality of conductive terminals 3. In the first embodiment shown in FIGS. 3 to 6, a resilient arm and a fixing portion of the testing terminal are not linear. In the second embodiment shown in FIGS. 7 to 10, the resilient arm and the fixing portion of the testing terminal are linear. In the third embodiment shown in FIG. 11, the resilient arm of the testing terminal directly extends from the fixing portion.

Further in detail, the first embodiment of the present invention shown in FIGS. 3 to 6, the testing terminal 4 has a fixing portion 41, a connecting portion 42, a soldering portion 43, a resilient arm 44 and a contacting portion 45, wherein, the contacting portion 45 is formed by outwardly extending and bending from the resilient arm 44; the fixing portion 41 is formed by extending and bending from one end of the connecting portion 42 toward one side of the connecting portion 42, the soldering portion 43 is formed by extending from the other end of the connecting portion 42 toward the side the fixing portion 41 locates, the resilient arm 44 extends outward from the other end of the connecting portion 42 opposite to the end of the fixing portion 41 locates, opposite to the soldering portion 43, as shown in FIG. 3.

Figure 4A:
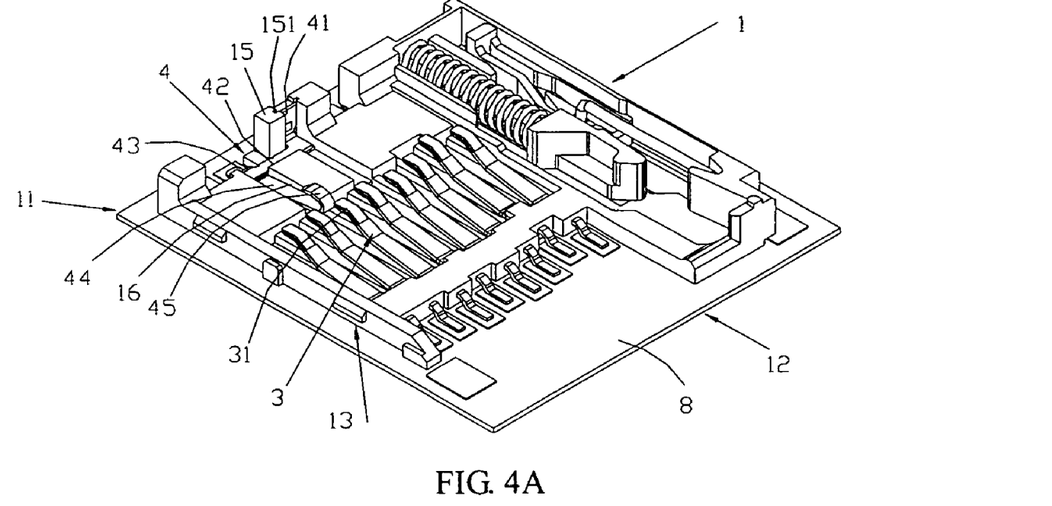
FIG. 4A is an assembled perspective view of the electronic card connector of the first embodiment of the present invention with a testing terminal mounted on an insulative housing of the electronic card connector, wherein a shield shell is omitted.
Figure 4B:
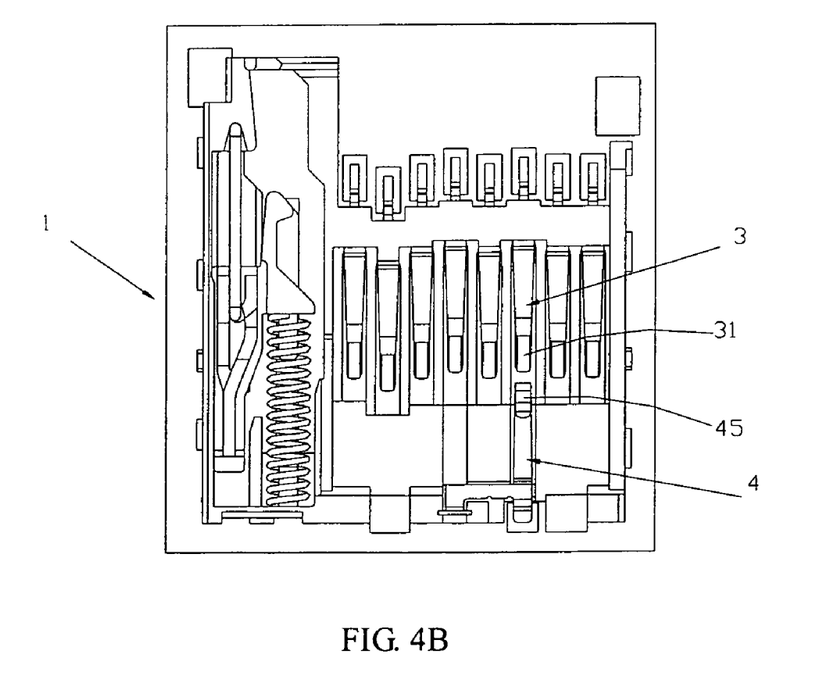
FIG. 4B is a top view of the FIG. 4A.
Figure 6:
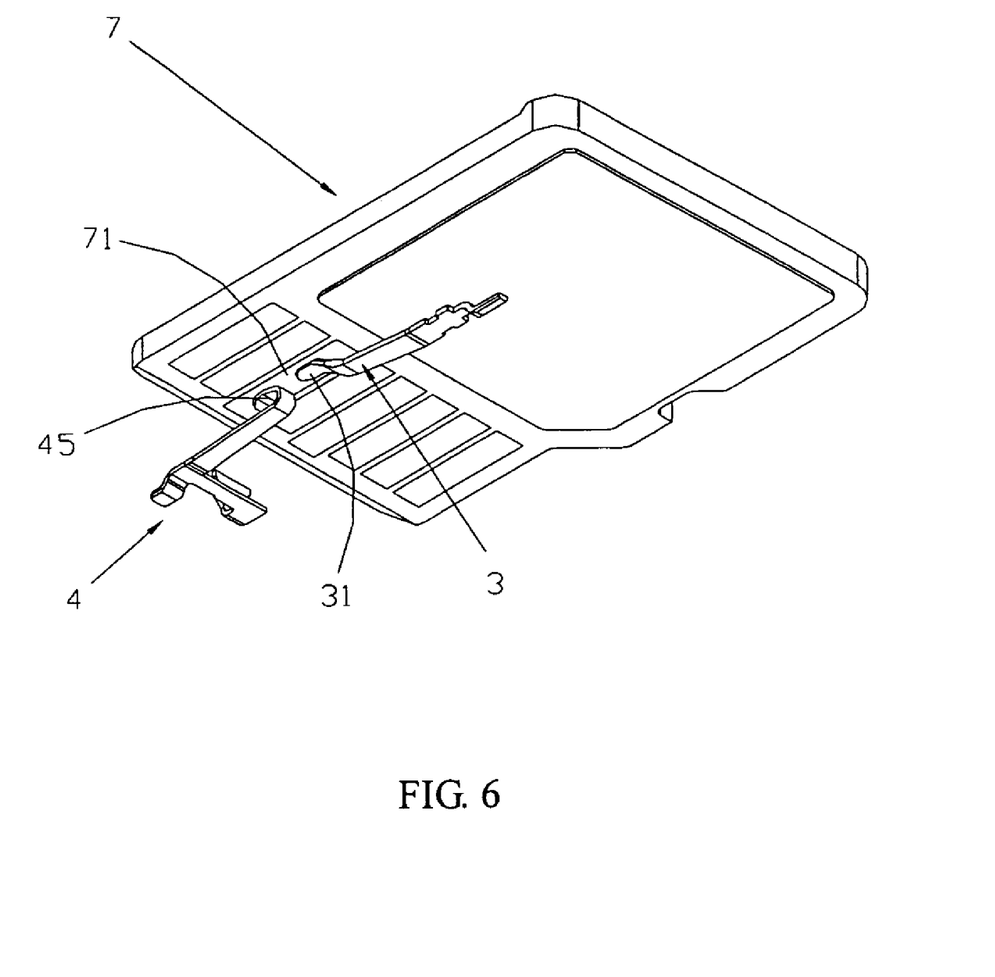
FIG. 6 shows a relative location state of the testing terminal and the conductive terminal facing to the testing terminal on the electronic card after the electronic card has been inserted into the electronic card connector in FIG. 5.

Referring to FIGS. 3, 4A and 4B, which detailed illustrate procedure of the testing terminal 4 being assembled to the insulative housing 1. As shown in FIG. 3, a fixing block 15 and a receiving slot 16 are formed in the front portion 11 of the bottom wall 13 of the insulative housing 1, the fixing portion 41 of the testing terminal 4 is insert-molding into the fixing block 15 of the insulative housing 1. The testing terminal 4 may also be fixed to the insulative housing 1 via a plug-in way, that is, the fixing portion 41 of the testing terminal is fixed to the fixing block 15 of the insulative housing 1 via barbs 411 of the fixing portion 41 being interference with inserting slots 151 of the fixing block 15; and at the same time, the resilient arm 44 is embedded and inserted into the corresponding receiving slot 16 of the front portion 11 of the insulative housing 1, then the soldering portion 43 is soldered to a corresponding soldering pad 81 of the circuit board 8, and here, the contacting portion 45 of the testing terminal 4 is spaced with and facing to the contacting portion 31 of one of the conductive terminals 3 (as shown in FIG. 4B). When the electronic card 7 is inserted into the receiving cavity 5 (see FIG. 5) from the insertion opening 6 for the electronic card, the contacting portion 45 of the testing terminal 4 and the contacting portion 31 of the conductive terminal 3 interval faced thereto contact one contact point 71 of the electronic card 7 at the same time, thereby forming a conductive circuit, and functioning as a switch, as shown in FIG. 6.

Figure 10:
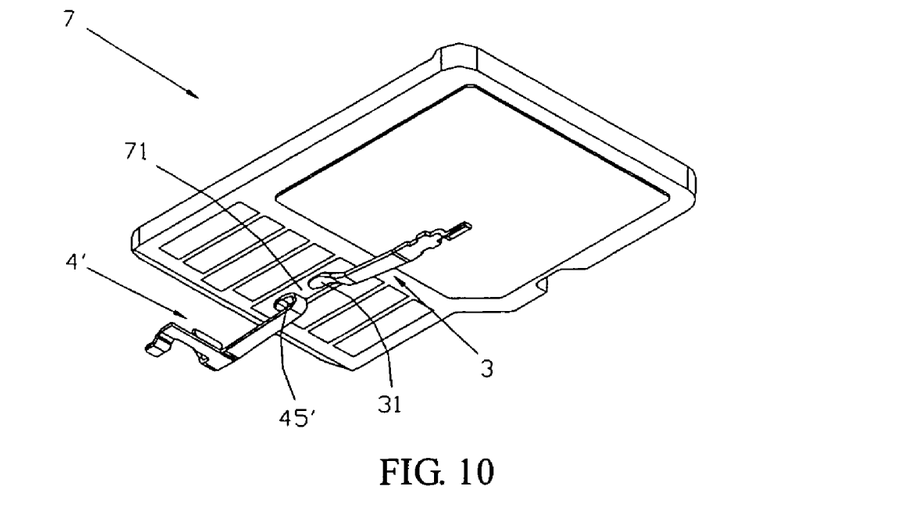
FIG. 10 shows a relative location state of the testing terminal and the conductive terminal faced to the testing terminal on the electronic card after the electronic card has been inserted into the electronic card connector in FIG. 9.

FIGS. 7 to 10 shown various state views of a second embodiment of the present invention, and the only difference between the second embodiment and the first embodiment is the shape of the testing terminal. The testing terminal 4' in the second embodiment has a fixing portion 41', a connecting portion 42', a soldering portion 43', a resilient arm 44' and a contacting portion 45', wherein, different from the testing terminal 4 in the first embodiment, the resilient arm 44' and the fixing portion 41' are located at opposite sides of an identical end of the connecting portion 42', as shown in FIG. 7. Therefore, after the testing terminal 4' is fixed to the insulative housing 1, the resilient arm 44' thereof is embedded in a corresponding receiving slot 16 of the insulative housing 1 (see FIG. 8A, different from the location in the first embodiment), and furthermore, the contacting portion 45' thereof is spaced with and facing to the contacting portion 31 of a corresponding conductive terminal 3 (see FIG. 8B), thereby the contacting portion 45' of the testing terminal 4' and the contacting portion 31 of the conductive terminal 3 interval faced thereto contact the contact point 71 of the electronic card 7 at the same time, thereby forming a conductive circuit, functioning as a switch, as shown in FIG. 10.

FIG. 11 is an exploded perspective view of the electronic card connector according to a third embodiment of the present invention. The third embodiment differs from the above-mentioned two embodiments in shape of the testing terminal and assembly of the testing terminal with the insulative housing. As shown in FIG. 11, the testing terminal 4" in the third embodiment has a fixing portion 41", a soldering portion 42", a resilient arm 43" and a contacting portion 44", wherein, as different from the testing terminals 4 and 4' in the first and the second embodiments, respectively, the testing terminal 4" in the third embodiment omits the connecting portion, the soldering portion 42" and the resilient arm 43" are formed by extending outward from two ends of the fixing portion 41", respectively. In this embodiment, two sides of the fixing portion 41" have barb 411", respectively, the contacting portion 44' is formed by bending outward from the resilient arm 43". Another difference between this embodiment and the other two embodiments mentioned above is that, the insulative housing 1 cancels the fixing portion (as reference number 15 in the first embodiment and label 15' in the second embodiment), thereby during assembly, the fixing portion 41" of the testing terminal 4" is embedded and inserted into a corresponding receiving slot 16 in the insulative housing 1, and is fixed by the barbs 411" of the fixing portion 41" interference with two side walls of the receiving slot 16, respectively, then, like the above-mentioned two embodiments, the soldering portion 42" is soldered to a corresponding soldering pad 81 of the circuit board 8, so that the contacting portion 45' of the testing terminal 4" also is spaced with and facing to the contacting portion 31 of one of the conductive terminals 3 (not shown).

It should be noted that, structures of the testing terminals of the present invention are not limited to those described in the above-mentioned three embodiments, and at the same time, the testing terminal may be selectively spaced with and facing to anyone of the conductive terminals to form a testing circuit, correspondingly, locations and numbers of the fixing block and the receiving slot of the insulative housing and of the soldering pads on the circuit board may be adjusted and add or subtract, respectively, so as to adapt for the testing terminal.

Although the present invention is disclosed above through the preferred embodiments which are not for limiting the present invention, anyone skilled in the art may do a few of modification and improvement without departing from the spirit and range of the present invention, accordingly, the protection range of the present invention should be based on claims defined by the present patent application.

What we claimed is:

1. An electronic card connector, comprising:
   an insulative housing;
   a shield shell, being mounted on the insulative housing, and combining therewith in defining a receiving cavity;
   a plurality of conductive terminals, being mounted on the insulative housing, each conductive terminal having a contacting portion extending into the receiving cavity; and
   a testing terminal, being mounted on the insulative housing, and having a contacting section aligned with and facing the contacting portion of one of the conductive terminal in a direction of inserting/ejecting an electronic card so that, in operation, the testing terminal and one of the conductive terminals engages the same contact on a inserted card.

2. The electronic card connector as claimed in claim 1, wherein the insulative housing has a front portion and a rear portion; the receiving cavity defines an insertion opening for receiving the electronic card which is located at the rear portion of the insulative housing; the plurality of conductive terminals are mounted at the rear portion of the insulative housing, and the contacting portions thereof are facing toward the front portion of the insulative housing; and the testing terminal is mounted at the front portion of the insulative housing.

3. The electronic card connector as claimed in claim 1, wherein the testing terminal has a fixing portion, a soldering portion, a resilient arm and the contacting section, wherein the contacting section is formed by extending outward from the resilient arm.

4. The electronic card connector as claimed in claim 3, wherein the soldering portion and the resilient arm are located at opposite sides of the fixing portion, respectively.

5. The electronic card connector as claimed in claim 3, wherein the testing terminal further comprises a connecting portion.

6. The electronic card connector as claimed in claim 5, wherein the fixing portion and the resilient arm are formed by extending sideward from one end of the connecting portion in two opposite directions, respectively, and the other end of the connecting portion extends outward to form the soldering portion.

7. The electronic card connector as claimed in claim 5, wherein one end of the connecting portion extends outward to form the fixing portion, and the soldering portion and the resilient arm are formed by extending sideward from the other end of the connecting portion in two opposite directions, respectively.

8. The electronic card connector as claimed in claim 6, wherein the soldering portion and the fixing portion are located at an identical side of the connecting portion.

9. The electronic card connector as claimed in claim 6, wherein the insulative housing has a fixing block, and the fixing portion of the testing terminal is engaged with the fixing block.

10. The electronic card connector as claimed in claim 9, wherein the fixing portion of the testing terminal has barbs.

11. The electronic card connector as claimed in claim 1, wherein after the electronic card is inserted into the receiving cavity, the contacting section of the testing terminal and the contacting portion of the conductive terminal interval faced thereto contact one contacting point of the electronic card at the same time, thereby forming a conductive circuit, and functioning as a switch.

12. The electronic card connector as claimed in claim 1, wherein the testing terminal has a soldering portion that is configured to be soldered to a supporting circuit board, the soldering portion being configured to be the only point of contact with the supporting circuit board.

13. The electronic cart connector as claimed in claim 1, wherein the testing terminal is configured to create a circuit between the testing terminal and the conductive terminal aligned with the testing terminal.

* * * * *